(12) United States Patent
Gupta et al.

(10) Patent No.: US 11,295,145 B2
(45) Date of Patent: *Apr. 5, 2022

(54) OBJECT DETECTION USING VEHICULAR VISION SYSTEM

(71) Applicant: MAGNA ELECTRONICS INC., Auburn Hills, MI (US)

(72) Inventors: Nikhil Gupta, Brampton (CA); Liang Zhang, Ottawa (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 203 days.

This patent is subject to a terminal disclaimer.

(21) Appl. No.: 16/578,692

(22) Filed: Sep. 23, 2019

(65) Prior Publication Data
US 2020/0019796 A1     Jan. 16, 2020

Related U.S. Application Data

(63) Continuation of application No. 16/266,180, filed on Feb. 4, 2019, now Pat. No. 10,423,842, which is a continuation of application No. 15/221,912, filed on Jul. 28, 2016, now Pat. No. 10,204,279.

(60) Provisional application No. 62/198,880, filed on Jul. 30, 2015.

(51) Int. Cl.
*G06K 9/00*     (2006.01)
*G06T 7/277*     (2017.01)

(52) U.S. Cl.
CPC .......... *G06K 9/00805* (2013.01); *G06T 7/277* (2017.01); *G06T 2207/30261* (2013.01)

(58) Field of Classification Search
CPC ................ G06K 9/00805; G06T 7/277; G06T 2207/30261
USPC ........................................................ 382/104
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 10,204,279 | B2 | 2/2019 | Gupta et al. |
| 10,423,842 | B2 | 9/2019 | Gupta et al. |
| 2006/0177099 | A1 | 8/2006 | Zhu et al. |
| 2008/0151049 | A1* | 6/2008 | McCubbrey ..... G08B 13/19671 348/143 |

(Continued)

*Primary Examiner* — Amandeep Saini
(74) *Attorney, Agent, or Firm* — Honigman LLP

(57) ABSTRACT

A method for determining objects of interest using a vehicular vision system includes providing at least one camera and providing a control having an image processor that processes image data captured by the camera. An object present in the field of view of the camera is detected via processing at the control of a first frame of captured image data. Hypotheses filtering and hypotheses merging may be utilized when processing additional frames of captured image data to discern the detected object being an object of interest from the detected object being not an object of interest. Hypotheses filtering includes tracking the detected object over multiple additional frames of captured image data, and hypotheses merging includes comparing outputs of hypotheses filtering for the multiple additional frames of captured image data. The detected object may be determined to be an object of interest responsive to results of hypotheses merging.

13 Claims, 9 Drawing Sheets

(56) References Cited

U.S. PATENT DOCUMENTS

| | | | |
|---|---|---|---|
| 2008/0273752 A1* | 11/2008 | Zhu | G08G 1/167 |
| | | | 382/103 |
| 2014/0169627 A1 | 6/2014 | Gupta | |
| 2014/0347486 A1 | 11/2014 | Okouneva | |
| 2014/0350834 A1 | 11/2014 | Turk | |
| 2015/0002670 A1 | 1/2015 | Bajpai | |
| 2015/0175072 A1 | 6/2015 | Sabeti | |
| 2015/0178576 A1 | 6/2015 | Gupta | |
| 2015/0219462 A1* | 8/2015 | Stumper | G01C 21/34 |
| | | | 701/410 |
| 2015/0291215 A1 | 10/2015 | Bajpai et al. | |
| 2016/0180158 A1 | 6/2016 | Gupta et al. | |
| 2016/0180180 A1 | 6/2016 | Gupta et al. | |
| 2016/0180182 A1 | 6/2016 | Gupta et al. | |
| 2016/0325682 A1 | 11/2016 | Gupta et al. | |
| 2016/0335510 A1 | 11/2016 | Gupta et al. | |
| 2017/0017848 A1 | 1/2017 | Gupta et al. | |
| 2017/0032196 A1 | 2/2017 | Gupta | |

\* cited by examiner

Use of Fish-eye Optics (Associated Problems)

- Some examples from side camera (The features not only vary in size, but also in orientation):

OBJECT DETECTION USING VEHICULAR VISION SYSTEM

CROSS REFERENCE TO RELATED APPLICATIONS

The present application is a continuation of U.S. patent application Ser. No. 16/266,180, filed Feb. 4, 2019, now U.S. Pat. No. 10,423,842, which is a continuation of U.S. patent application Ser. No. 15/221,912, filed Jul. 28, 2016, now U.S. Pat. No. 10,204,279, which claims the filing benefits of U.S. provisional application Ser. No. 62/198,880, filed Jul. 30, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and, responsive to image processing of captured image data, determines objects present exterior of the vehicle. The system of the present invention utilizes an object detection module or algorithm to detect objects present in the field of view of the camera, and then, responsive to detection of objects, the systems performs hypotheses filtering and merging to predict new hypotheses and then to evaluate the hypotheses to determine or discern objects of interest (such as pedestrians or bicyclists or other vehicles on the road that is being traveled by the equipped vehicle) from objects not of interest (such as objects such as trees or the like, that are not on or near the road and thus are not of interest to the driver or driver assistance system of the vehicle).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
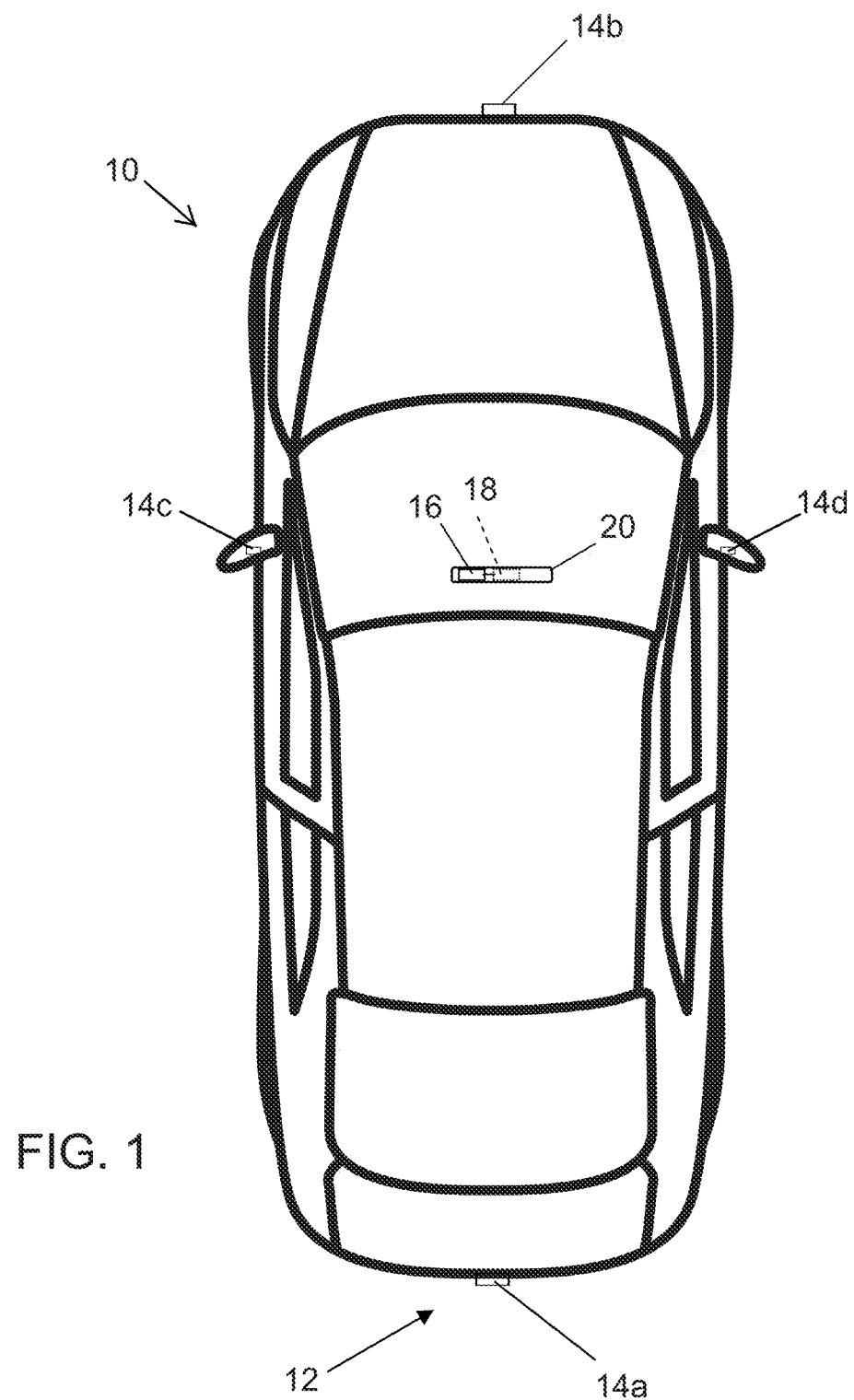
FIG. 1 is a plan view of a vehicle with a vision system that incorporates cameras in accordance with the present invention.
Figure 2:
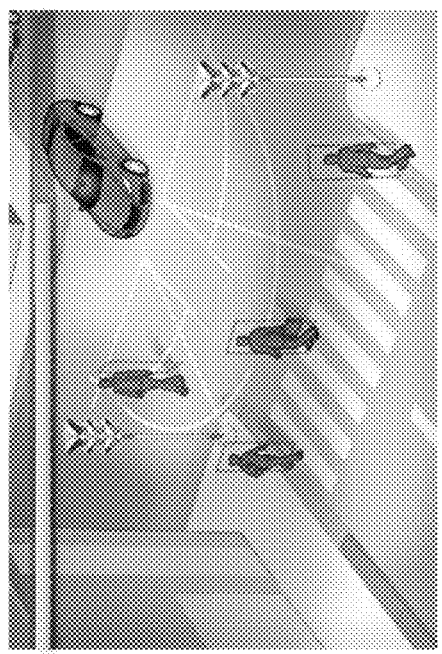
FIG. 2 is a perspective view of a vehicle and pedestrians forward of the vehicle and in the field of view of the forward facing camera or cameras of the vehicle.
Figure 3:
FIG. 3 is an image of a pedestrian in front of a vehicle as may be viewed by a driver of the vehicle.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Surround awareness and driver assistance is a marketable feature for vehicles. Generic object detection using fish eye camera is one such feature. Object detection in the scene needed to add value to existing detection based algorithms (such as, for example, object detection (OD), blind spot detection (BSD), Automatic parking spot detection and/or the like). The object/distance estimation may act as a stand-alone object detection feature. Object detection is a tracking-and-detection issue that requires information on corresponding feature points in sequential images or frames of captured image data and camera parameters at each view point of a moving camera. Most past development centered around object detection using feature and object detection and obstacle extraction and identification.

Figure 4:
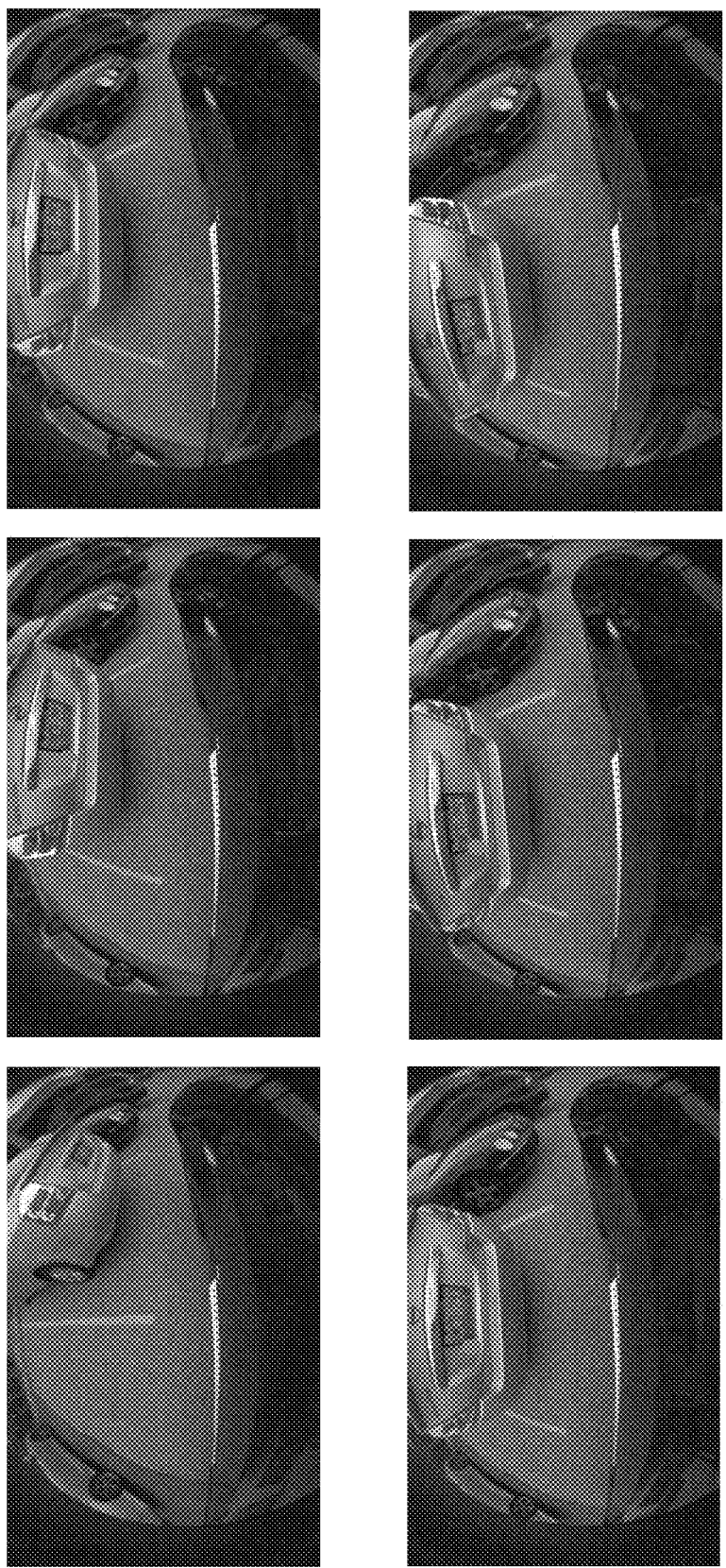
FIG. 4 shows images of use of fish-eye optics with a vehicle camera.

Use of fish-eye optics or lenses (see FIG. 4) on vehicular cameras may have associated difficulties. There is an increase in the use of fish-eye optics with the developing market interest in smart surround view systems. The features cannot be measured exactly in these fish-eye images, and this leads to a loss in accuracy of object detection. Such fish-eye optics thus may create performance/robustness issues since the variations possible in the object detection due to the inaccurate measurement of image features in these images, which may lead to a temporally inconsistency of object detection. In an image captured by use of a fish-eye lens, the features not only vary in size, but also in orientation.

Figure 5:
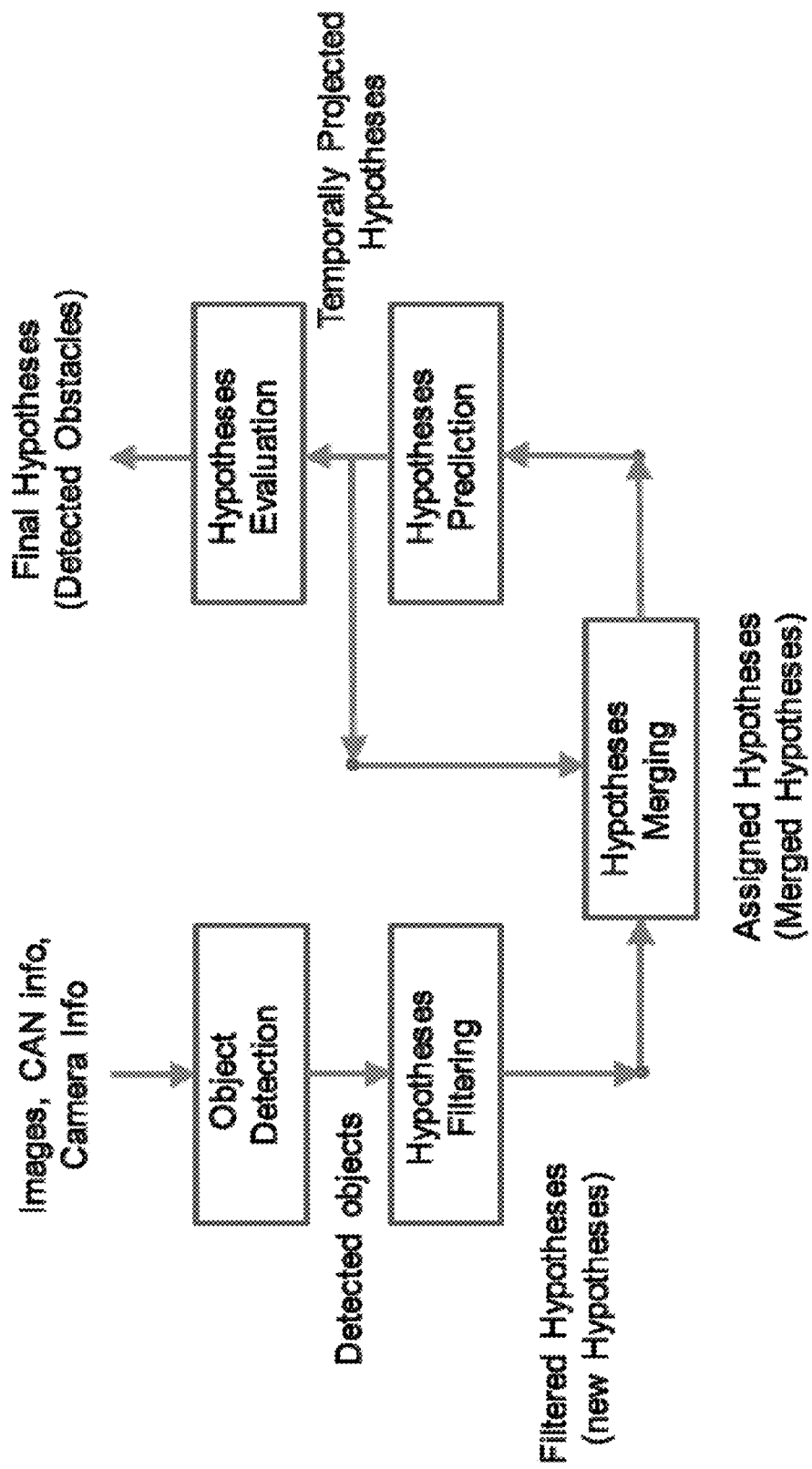
FIG. 5 is a block diagram of the object detection system of the present invention.

The present invention provides for enhanced object detection via image processing of image data captured by one or more cameras at the vehicle. To mitigate the effect of temporally inconsistent object detection, a new tracking-and-detection based apparatus is proposed to detect objects from captured fish-eye images, which comprises the modules (including object detection, hypotheses filtering, hypotheses merging, hypotheses prediction and hypotheses evaluation) shown in FIG. 5.

Figure 6:
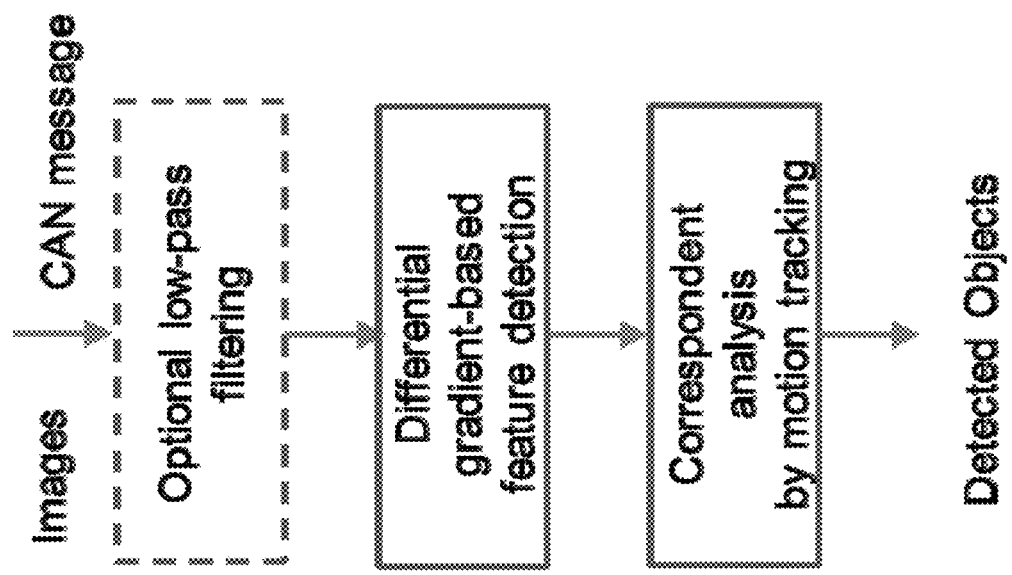
FIGS. 6-10 are block diagrams of the modules or algorithms used to enhance detection of objects and determination of objects of interest in accordance with the present invention.

As shown in FIG. 6, the object detection module receives image data captured by one or more vehicle cameras (such as via a CAN bus communication network of the vehicle) and uses optional low-pass filtering, differential gradient-based feature detection and correspondent analysis by motion tracking to detect objects present in the field of view of the camera or cameras. The input image data is optionally low-pass filtered to reduce the noise in the image data or images. After that, objects are first detected from the fish-eye images by differential gradient-based feature detection and correspondent analysis based on motion tracking estimation (such as by utilizing aspects of the systems described in U.S. Publication No. US-2014-0169627, which is hereby incorporated herein by reference in its entirety). The detected objects that have significant motion in the captured images will serve as candidates of potential objects or obstacles of interest to the system.

Figure 7:
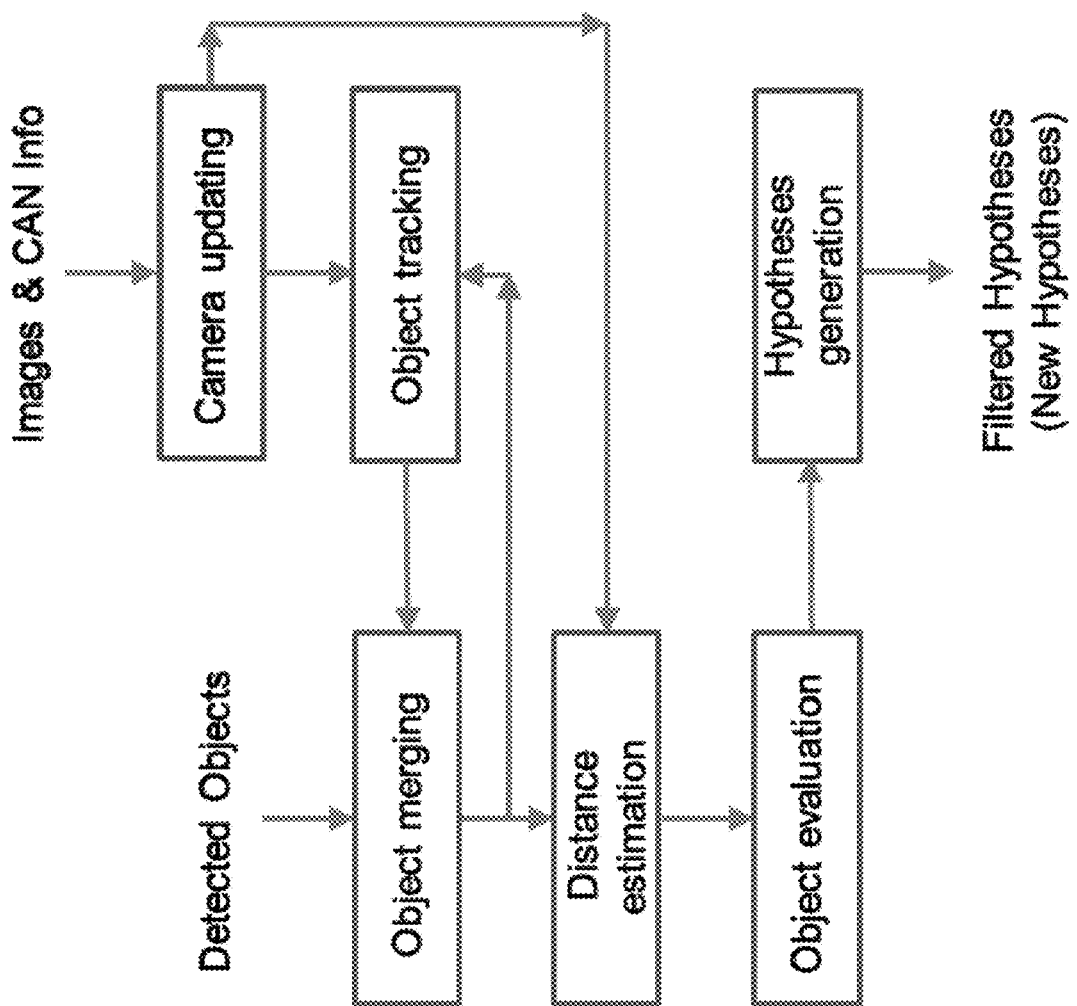

As shown in FIG. 7, the output of the object detection module (indicating detected objects) is input to the hypotheses filtering module, which includes object merging, distance estimation, object evaluation, object tracking and hypotheses generation. The detected objects are merged with the objects that are detected in previous frames and tracked in the current frame, in order to ensure that more objects will be detected in the current frame. The associated distance of each object (such as distance from the vehicle) is calculated using a SfM (structure from motion) method (such as by utilizing aspects of the systems described in U.S. Publication No. US-2016-0180182, which is hereby incorporated herein by reference in its entirety) or back-to-ground projection in case that SfM method fails. The objects will undergo an object evaluation to reject the objects on the ground or along the street or curb. The objects that successfully pass through the object evaluation will serve as newly generated obstacle hypotheses (for the filtered hypotheses module). An index is used to present the reliability of the detected object, which takes into account how often this object is tracked so far, how many instances appear in the current frame, and whether the tracked object is merged with a newly detected object.

Figure 8:
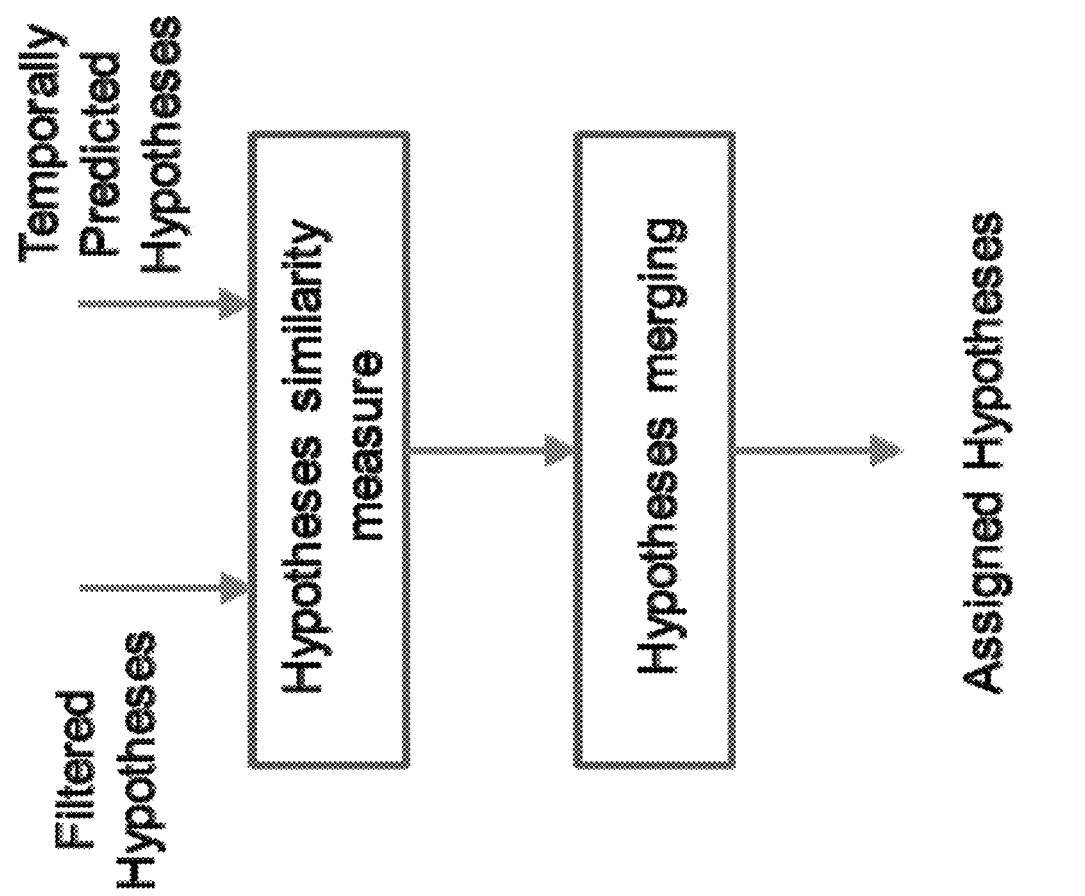

As shown in FIG. 8, the output of the filtered hypotheses module is input to the hypotheses merging module, which includes a hypotheses similarity measure and hypotheses merging. The filtered hypotheses are compared with the predicted hypotheses, which are generated from or derived from the previous frames and tracked in the current frame. The similarity between the filtered hypotheses and predicted hypotheses are measured. Both hypotheses are combined with merging the similar hypotheses together to build the so-called Assigned Hypotheses.

Figure 9:
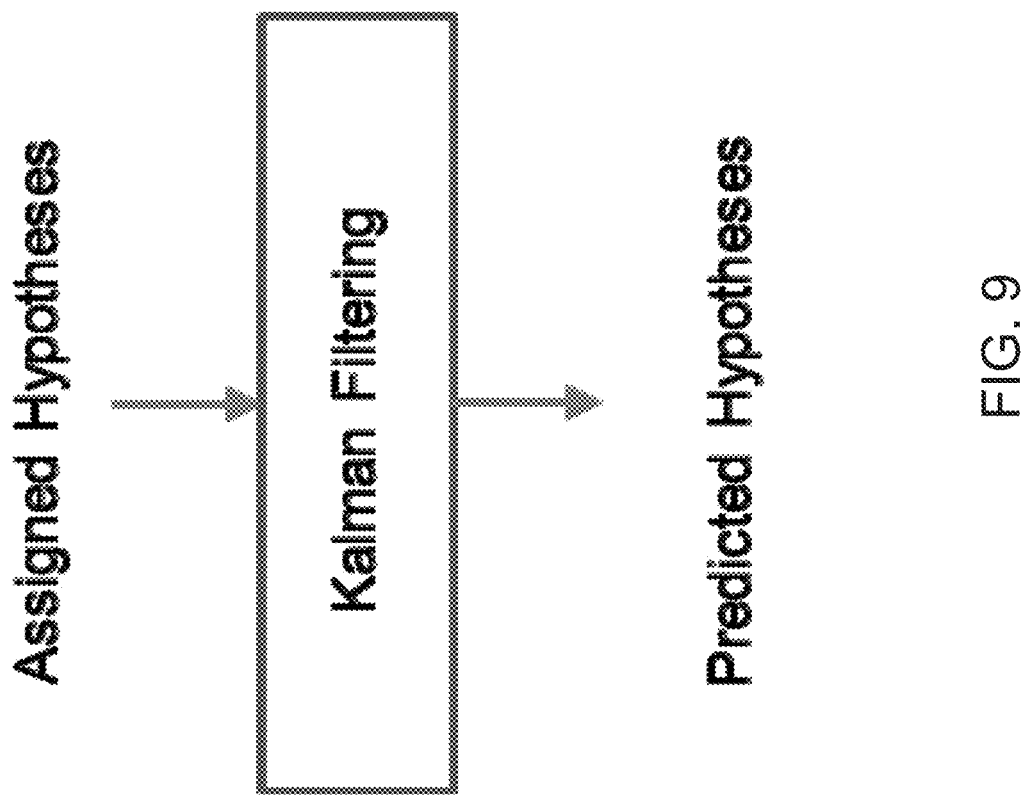

As shown in FIG. 9, the assigned hypotheses is input into the hypotheses prediction module, which includes Kalman filtering to generate predicted hypotheses. The assigned hypotheses are thus further processed using a modified Kalman filter and the outputs are named as the predicted hypotheses. The modified Kalman filter is used to estimate the filtered distance of objects in the current frame and to predict the distance of obstacles in the next frame in order to keep the temporal consistency of obstacles detection. For this, the objects' distance obtained by a SfM method is represented as an input to the modified Kalman filter in order to maintain a smooth temporal switch of object distances among SfM and Back-to-Ground projection.

Figure 10:
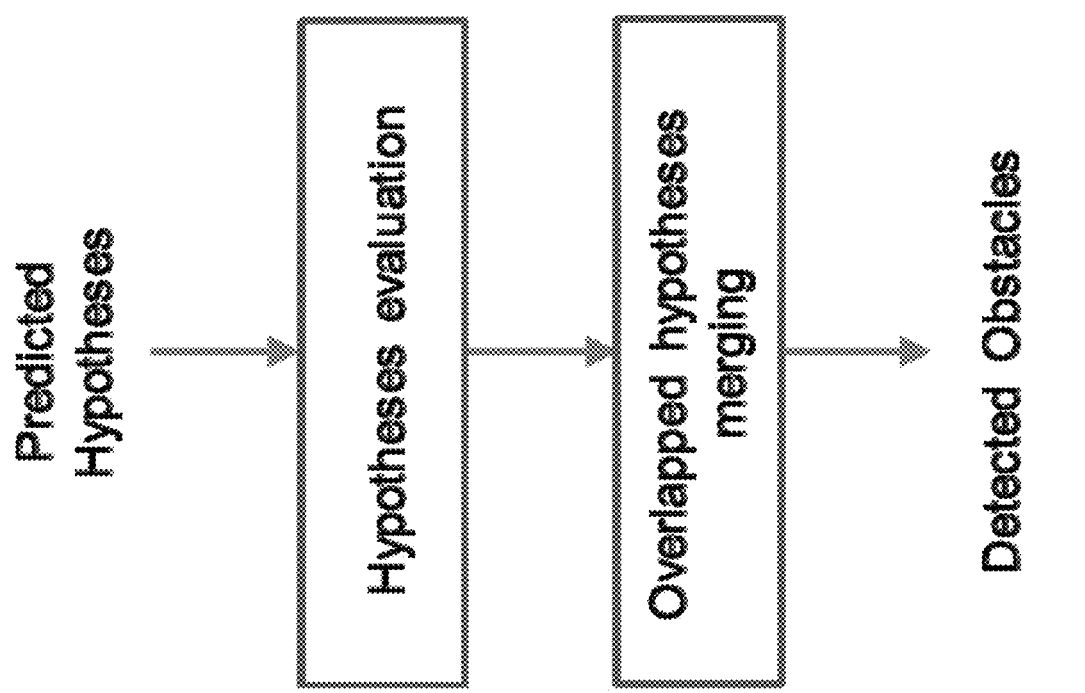

The predicted hypotheses is input to the hypotheses evaluation module, which (as shown in FIG. 10) includes hypotheses evaluation and overlapped hypotheses merging. The predicted hypotheses are further evaluated according to the geometrical relationship between objects and camera position to reject objects that are not of interest to the driver or vehicle system. After that, the hypotheses are further merged to build final results on object or obstacle detection to issue a warning for a close obstacle, if any are present.

Thus, the system of the present invention provides enhanced object tracking. The objects, which are detected via processing of previous frames of image data, are tracked in the current frame to ensure that more objects will be detected in the current frame for the generation of more new filtered hypotheses. The reliability of Hypotheses is also enhanced, where an index is introduced to present the reliability of one detected object, which takes into account how often the object is tracked so far, how many instances appear in the current frame, and whether the tracked object is merged with a newly detected object. Also, the present invention provides for temporal consistency of object distance estimation from SfM and back-to-ground projection. The associated distance and location of one hypothesis will be represented in case that its distance is calculated by a SfM method. The modified Kalman filter will take this represented association as an input for improving temporal consistency of obstacles detection, in which the distance is obtained by either SfM or back-to-ground projection.

The method and system of the present invention thus may determine the motion or path of the vehicle responsive to vehicle system inputs, such as inputs from or indicative of the vehicle steering wheel angle and/or vehicle speed and/or the like, and determines the motion and relative motion of an object in the field of view of the camera. The system of the present invention may utilize aspects of the systems described in U.S. Publication Nos. US-2016-0180158; US-2016-0180180; US-2016-0180182; US-2015-0291215; US-2014-0169627; US-2014-0347486; US-2014-0350834; US-2015-0178576; US-2015-0175072 and/or US-2015-0002670, and/or U.S. patent applications, Ser. No. 15/210,223, filed Jul. 14, 2016, now U.S. Pat. No. 10,078,789, Ser. No. 15/150,843, filed May 10, 2016, now U.S. Pat. No. 9,898,671, and/or Ser. No. 15/147,301, filed May 5, 2016 and published Nov. 10, 2016 as U.S. Publication No. US-2016-0325682, and/or U.S. patent application Ser. No. 15/221,913, filed Jul. 28, 2016 by Gupta for VEHICLE VISION SYSTEM WITH OBJECT AND LANE FUSION, and published Feb. 2, 2017 as U.S. Publication No. US-2017-0032196, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO 2010/144900 and/or WO 2013/043661, and/or U.S. Publication No. US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for determining objects of interest using a vehicular vision system, said method comprising:
providing at least one camera at an in-cabin side of a windshield of a vehicle so as to have a field of view through the windshield forward of the vehicle, wherein the camera comprises a pixelated imaging array having a plurality of photosensing elements;
providing a control at the vehicle, the control having an image processor that processes image data captured by said camera;
capturing frames of image data via the camera;
providing frames of image data captured by the camera to the control;
processing at the control frames of image data captured by the camera;
detecting, via processing at the control of a first frame of captured image data, an object present in the field of view of the camera;
processing additional frames of captured image data to discern the detected object being an object of interest from the detected object being not an object of interest;
utilizing hypotheses filtering and hypotheses merging when processing additional frames of captured image data to discern the detected object being an object of interest from the detected object being not an object of interest;
wherein hypotheses filtering comprises tracking the detected object over multiple additional frames of captured image data;
wherein hypotheses merging comprises comparing outputs of hypotheses filtering for the multiple additional frames of captured image data; and
responsive to results of hypotheses merging, determining that the detected object is an object of interest.

2. The method of claim 1, comprising predicting hypotheses and evaluating predicted hypotheses to determine that the detected object is an object of interest.

3. The method of claim 2, wherein determining that the detected object is an object of interest comprises hypotheses evaluation based at least in part on the predicted hypotheses.

4. The method of claim 1, wherein determining that the detected object is an object of interest comprises hypotheses prediction based at least in part on the results of hypotheses merging.

5. The method of claim 4, comprising repeating the hypotheses merging and the hypotheses prediction to enhance determination that the detected object is an object of interest.

6. The method of claim 4, comprising combining filtered hypotheses and predicted hypotheses to generate assigned hypotheses.

7. The method of claim 6, comprising inputting the assigned hypotheses into a hypotheses prediction module and providing an output of the hypotheses prediction module as (i) an input to hypotheses merging and (ii) an input into a hypotheses evaluation module.

8. The method of claim 1, wherein determining that the detected object is an object of interest comprises, responsive to the results of hypotheses merging, determining that the detected object is a pedestrian.

9. The method of claim 8, wherein determining that the detected object is an object of interest comprises, responsive to the results of hypotheses merging, discerning the pedestrian from a tree.

10. The method of claim 1, wherein determining that the detected object is an object of interest comprises, responsive to the results of hypotheses merging, determining that the detected object is a bicycle.

11. The method of claim 10, wherein determining that the detected object is an object of interest comprises, responsive to the results of hypotheses merging, discerning the bicycle from a tree.

12. The method of claim 1, wherein hypotheses merging and hypotheses prediction comprises use of Kalman filtering.

13. The method of claim 1, wherein the camera comprises a fisheye lens.

* * * * *